(12) United States Patent
Henk et al.

(10) Patent No.: US 6,460,678 B1
(45) Date of Patent: Oct. 8, 2002

(54) LINEAR MOTION BRAKE

(75) Inventors: Michael Henk, Spooner, WI (US); Grant S. Blume, St. Paul, MN (US); Karl W. Oberjohn, Park Hills, KY (US); Steve Olson, Danbury; Timothy S. Tessman, Grantsburg, both of WI (US)

(73) Assignee: Nexen Group, Inc., Vadnais Heights, MN (US)

( * ) Notice: Subject to any disclaimer, the term of this patent is extended or adjusted under 35 U.S.C. 154(b) by 0 days.

(21) Appl. No.: 09/695,507

(22) Filed: Oct. 24, 2000

(51) Int. Cl.$^7$ ............................................. F16D 65/24

(52) U.S. Cl. ..................................... 192/143; 188/170

(58) Field of Search ............................. 192/143, 144; 188/151 R, 153 R, 166, 170; 104/249, 251, 258, 259; 92/19, 88

(56) References Cited

U.S. PATENT DOCUMENTS

| | | | | |
|---|---|---|---|---|
| 3,388,606 A | * | 6/1968 | Hill | |
| 3,535,944 A | * | 10/1970 | Newstead | |
| 3,705,554 A | * | 12/1972 | Aksamit | 104/250 |
| 3,789,959 A | * | 2/1974 | Kawaguchi | 188/71.9 |
| 4,018,313 A | * | 4/1977 | Hart et al. | 188/343 |
| 4,280,603 A | * | 7/1981 | Kanvar | 188/343 |
| 4,300,664 A | * | 11/1981 | Helm et al. | 188/265 |
| 4,615,515 A | * | 10/1986 | Suzuta et al. | |
| 4,633,758 A | * | 1/1987 | Kedzierski | 91/44 |
| 4,638,894 A | * | 1/1987 | Sitabkhan et al. | |
| 4,703,683 A | * | 11/1987 | Sue | 92/24 |
| 4,779,787 A | * | 10/1988 | Naruse et al. | |
| 4,825,746 A | * | 5/1989 | Herner | 91/45 |
| 5,111,913 A | * | 5/1992 | Granbom | |
| 5,184,700 A | * | 2/1993 | Mainardi | 188/67 |
| 5,333,535 A | * | 8/1994 | Miyamoto et al. | 92/88 |
| 5,363,942 A | * | 11/1994 | Osada | |
| 5,377,788 A | * | 1/1995 | Biewald et al. | |
| 5,518,087 A | * | 5/1996 | Hwang et al. | |
| 5,524,548 A | * | 6/1996 | Fox | 104/249 |
| 5,626,082 A | * | 5/1997 | Nozaki | 104/252 |
| 5,732,799 A | * | 3/1998 | Chikamatsu et al. | 188/67 |

(List continued on next page.)

FOREIGN PATENT DOCUMENTS

| | | | |
|---|---|---|---|
| DE | 2032625 | * | 7/1969 |
| DE | 0130400 | * | 3/1978 |
| FR | 1150619 | * | 5/1956 |
| GB | 2175669 | * | 12/1986 |
| IT | 659911 | * | 1/1964 |
| RU | 800447 | * | 1/1981 |

*Primary Examiner*—Saul Rodriguez
(74) *Attorney, Agent, or Firm*—Rider, Bennett, Egan & Arundel, LLP; Alan Kamrath

(57) ABSTRACT

A brake (10) having particular application for a linear motion device (12) includes a channel (82) secured to the base plate (14) in which a body (120) secured to the sliding plate (16) partially extends. A tape seal (112) of the channel (82) extends through a slot (180) formed in the body (120) so that the calipers (15) moveably mounted to the body (120) are located within a hollow interior of the channel (82). The calipers (152) include cylindrical carriers (154) slideably received in cross bores (130) in the body (120) and are biased to a disengaged position by a spring (164) sandwiched between a snap ring (162) in the cross bore (130) and the carrier (152). A diametric groove (156) is formed on the inner axial end of the carrier (154) and slideably receives a side (140) of an actuator element (138) which extends in a non-axial direction. The actuator element (138) is moveably mounted in an axial through bore (122) by first and second supports (142, 143) secured to the axial ends and including an elastomeric seal (144) to compliantly suspend the actuator element (138) in the through bore (122). The actuator element (138) is moved in a first axial direction by a spring (146) and in the opposite axial direction by fluid pressure in a fluid chamber.

23 Claims, 4 Drawing Sheets

U.S. PATENT DOCUMENTS

| | | | | |
|---|---|---|---|---|
| 5,829,811 A | * | 11/1998 | Skinner, II | 294/88 |
| RE36,084 E | * | 2/1999 | Gutknecht | 104/249 |
| 5,950,773 A | * | 9/1999 | Ito | |
| 5,967,051 A | * | 10/1999 | Ragsdale et al. | 104/252 |
| 5,988,042 A | * | 11/1999 | Lamle | 92/88 |
| 6,135,029 A | * | 10/2000 | Oberjohn | 104/290 |
| 6,164,185 A | * | 12/2000 | Granbom | 92/19 |
| 6,227,336 B1 | * | 5/2001 | Rudy | 188/43 |

* cited by examiner

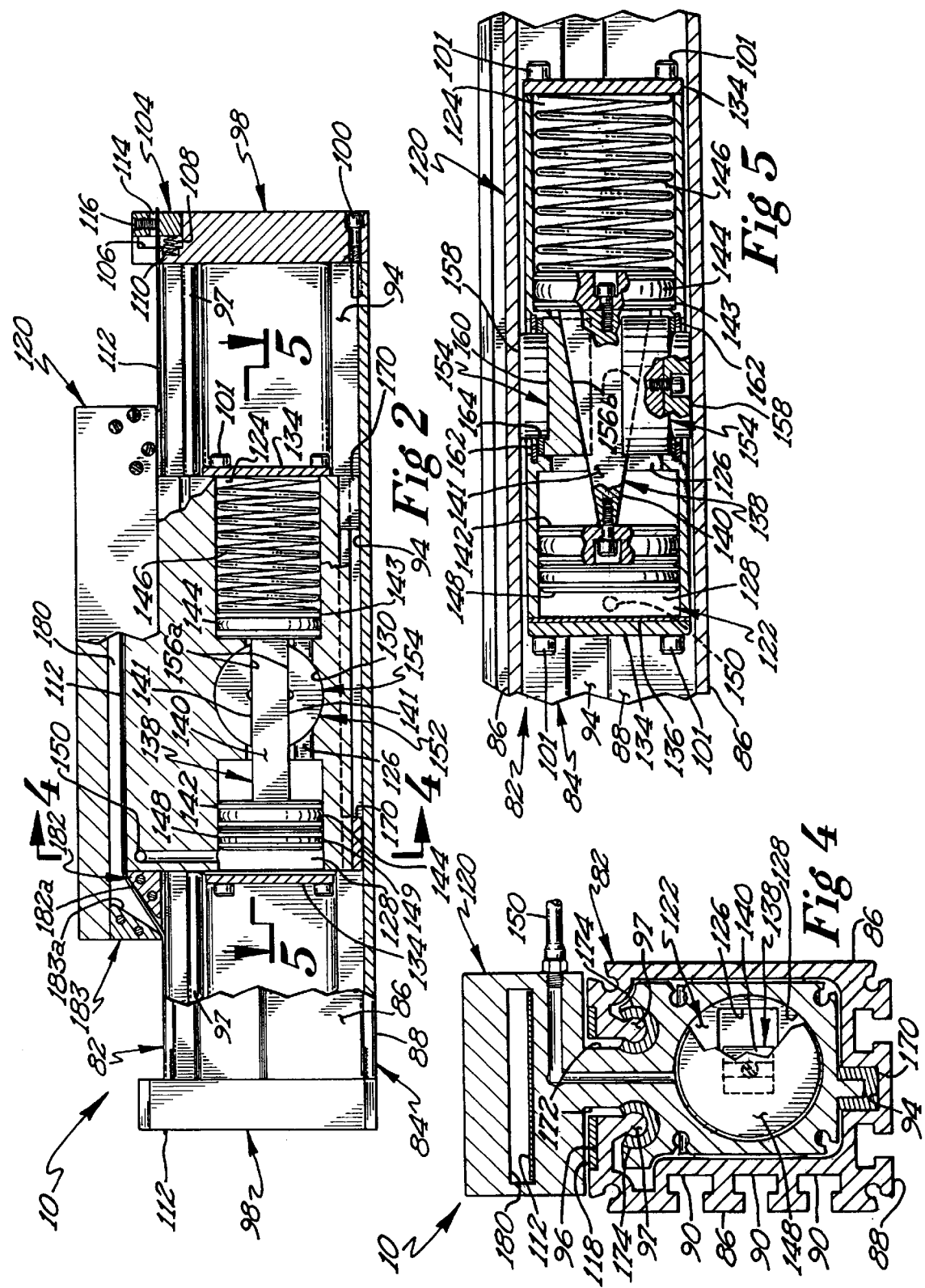

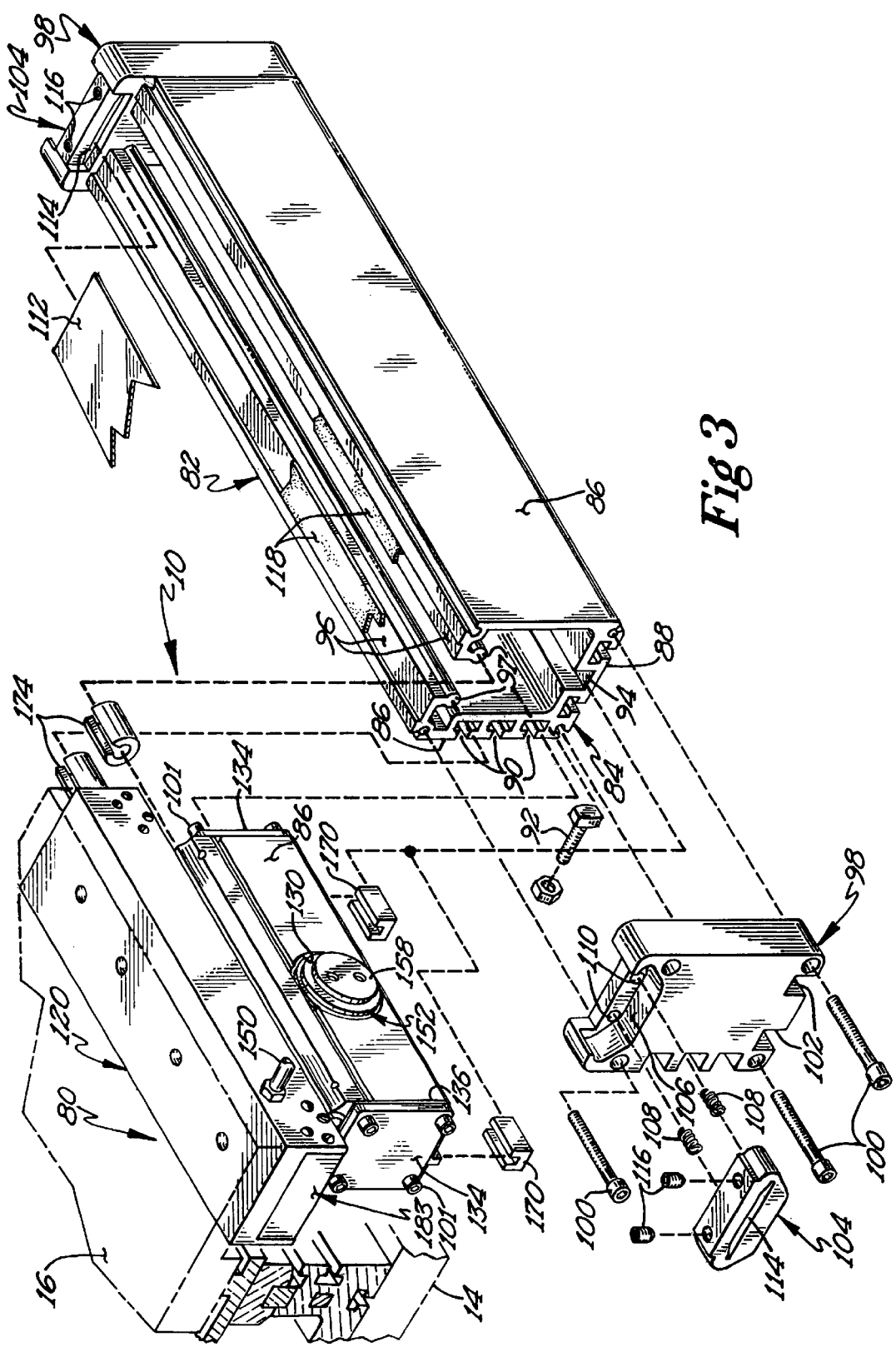

LINEAR MOTION BRAKE

BACKGROUND

The present invention generally relates to motion control apparatus and in particular brakes, specifically relates to brakes for linear motion applications, and more specifically relates to linear motion brakes having special application to power-off situations.

The popularity of linear motion devices in the machine tool, semiconductor, and medical industries has been increasing as the result of their ability to move a load in a linear movement direction to a position with extreme accuracy and at very high speeds. However, problems have been encountered in stopping linearly moving loads especially in the event of a power outage. Specifically, as movement and positioning of the load is dependent upon current being supplied to the linear motor, loads carried by linear motion devices will move under gravitational and/or inertia forces in the event that current is interrupted to the linear motor such as the result of a power outage. This problem is also enhanced in linear motion devices because of the use of high performance linear bearings which minimize sliding friction.

Although marketing of linear motion device packages is increasing in popularity, often the end user purchases the various components of linear motion devices such as linear bearings, armatures and magnet tracks or stators, and position feedback devices and arranges such components according to their particular application. Thus, linear motion devices have a variety of configurations.

Although linear motion brakes have been utilized in other fields such as roller coasters, attempts to provide brakes for stopping linear motion of loads driven by linear motion devices have not been commercially viable, possibly due to their relative small size.

Thus, a need exists for a brake for stopping linearly moving loads and especially for use with linear motion devices and particularly for use in stopping linearly moving loads in the event of a power outage, emergency stop, parking, or similar situation. In a preferred aspect, the linear motion brake must be adaptable for use with any configuration of a linear motion device and in most preferred aspects is modular in form for attachment to the linear motion device if and when braking is desired in the particular application of the linear motion device.

SUMMARY

The present invention solves these needs and other problems in the field of brakes for linear motion applications by providing, in the preferred form, a brake having special application for use with a linear motion device. In preferred aspects, at least a first friction element and a U-shaped track are spaced from and parallel to the linear bearings and the armature and stator of the linear motion device, with the first friction element located within the U-shaped track and being movable between an engaged position engaging with the U-shaped track and stopping movement of the sliding plate relative to the base plate and a disengaged position which does not impede movement of the sliding plate relative to the base plate. In most preferred aspects of the present invention, the linear motion brake is located outside of the linear motion device spaced in a direction generally perpendicular to the linear movement direction and in the preferred form parallel to the linear motion device but offset from the linear motion device. In other aspects, a channel including the U-shaped track and a tape seal defines a hollow interior, with the body to which the friction element is moveably mounted including a slot slideably receiving the tape seal with linear motion of the sliding plate relative to the base plate.

In other preferred aspects of the present invention, the actuator element which moves the carrier for an interface element between an engaged and disengaged position is moveably mounted in the axial bore of a body allowing self-centering of the actuator element in the axial bore in non-axial directions.

Still in other aspects of the present invention, the carrier for an interface element is biased into a cross bore by a spring sandwiched between a stop in the cross bore and the carrier. In further aspects of the present invention, the actuator element which moves the carrier for an interface element between an engaged and disengaged position is received in a diametric groove of the carrier for preventing rotation of the carrier in the cross bore of the body.

It is thus an object of the present invention to provide a novel apparatus for controlling motion.

It is further an object of the present invention to provide such a novel motion controlling apparatus stopping linear motion.

It is further an object of the present invention to provide such a novel motion controlling apparatus having special application for use with a linear motion device.

It is further an object of the present invention to provide such a novel motion controlling apparatus for use in the event of a power outage, emergency stop, parking or similar situation.

It is further an object of the present invention to provide such a novel motion controlling apparatus adaptable for use with any configuration of linear motion device.

It is further an object of the present invention to provide such a novel motion controlling apparatus of a modular form.

It is further an object of the present invention to provide such a novel motion controlling apparatus applying a constant engagement force at any position in the linear movement direction.

It is further an object of the present invention to provide such a novel motion controlling apparatus having a small cross sectional size in directions perpendicular to the linear movement direction.

It is further an object of the present invention to provide such a novel motion controlling apparatus utilizing mechanical advantage to reduce the input power requirements.

It is further an object of the present invention to provide such a novel motion controlling apparatus easily adaptable to utilize different types of actuators.

It is further an object of the present invention to provide such a novel motion controlling apparatus formed of relatively few easily manufactured and assembled components.

It is further an object of the present invention to provide such a novel motion controlling apparatus having minimal effect on the dynamics of the linear motion.

It is further an object of the present invention to provide such a novel motion controlling apparatus minimizing side loading of the linear bearings of a linear motion device.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 2 shows a cross sectional view of the linear motion brake of FIG. 1 according to section line 2—2 of FIG. 1.

FIG. 3 shows an exploded perspective view of the linear motion brake of FIG. 1.

FIG. 4 shows a cross sectional view of the linear motion brake of FIG. 1 according to section line 4—4 of FIG. 2.

FIG. 5 shows a cross sectional view of the linear motion brake of FIG. 1 according to section line 5—5 of FIG. 2.

Figure 1:
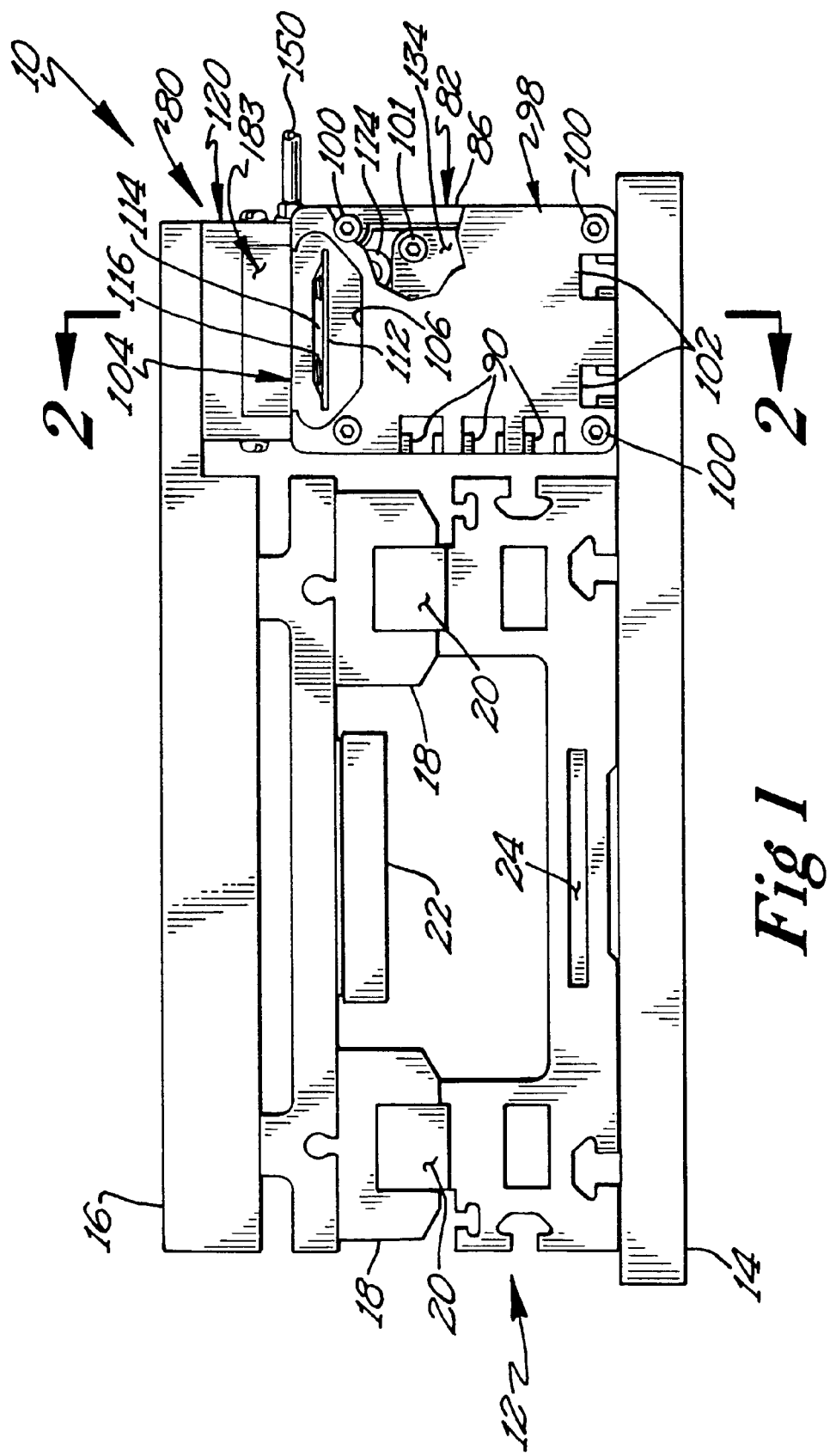
FIG. 1 shows an end view of a linear motion device and a linear motion brake according to the preferred teachings of the present invention.
Figure 6:
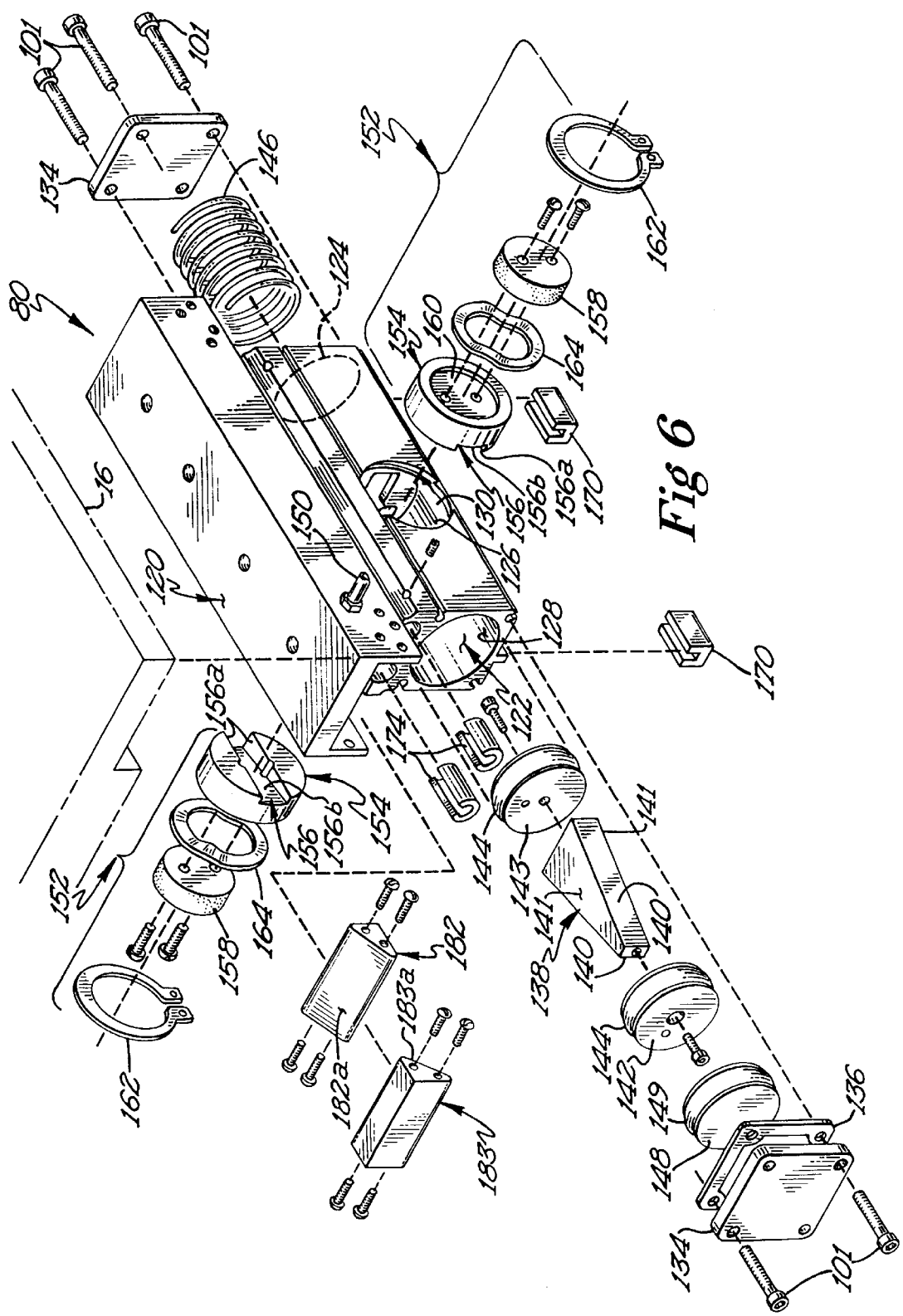
FIG. 6 shows an exploded perspective view of the brake head assembly of the linear motion brake of FIG. 1.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "inside", "outside", "upper", "lower", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiment.

DESCRIPTION

A brake for stopping linearly moving loads according to the preferred teachings of the present invention is shown in the drawings and generally designated 10. Brake 10 in its most preferred form is shown for use with a linear motion device 12 such as a linear stage or motor which can be of any conventional design including but not limited to the type shown. Generally, device 12 includes a base plate 14 and a sliding plate 16 mounted for linear motion for a distance relative to base plate 14 such as by two or more linear bearings 18 slideable upon linear races 20 in a linear movement direction. In the preferred form, bearings 18 and races 20 are purchased components such as from LinTech of Monrovia, Calif. Sliding plate 16 is driven relative to base plate 14 such as by an armature 22 secured to sliding plate 16 which slides through a stationary stator shown in the preferred form as a magnet track 24 secured to base plate 14. In the preferred form, armature 22 and magnet track 24 are purchased components such as from Aerotech, Inc. of Pittsburgh, Pa. By selectively supplying electrical current to armature 22 and/or stator 24, armature 22 will move relative to stator 24 thus resulting in the linear movement of sliding plate 16 relative to base plate 14. Feedback of the position of sliding plate 16 relative to base plate 14 can be suitably supplied to the controller for electrical current supply such as by a reading head secured to sliding plate 16 which slides or otherwise moves relative to a linear encoder scale secured to base plate 14. In the preferred form, the reading head and the linear encoder scale are purchased components such as from Acu-Rite, Inc. of Jamestown, N.Y.

It should be appreciated that linear motion device 12 according to the teachings of the present invention can have a variety of configurations including but not limited to the one shown and described. For example, linear motion device 12 could be installed in a preassembled stage including linear bearings and races 18 and 20, reading head, and linear encoding scale such as provided or offered by Bayside Corporation of Port Washington, N.Y. Additionally, although having particular application to linear motion devices 12 and believed to produce synergistic results therewith, brake 10 according to the teachings of the present invention may have application to other drives for providing linear motion including but not limited to ball screws, belt drives, air cylinders, and the like.

Brake 10 according to the preferred teachings of the present invention generally includes a brake head assembly 80 secured to one of base plate 14 or sliding plate 16 and a brake channel 82 secured to the other of base plate 14 or sliding plate 16. Channel 82 includes a generally U-shaped track 84 defined by first and second, interface, side walls 86 extending generally perpendicular from the opposite edges of a bottom wall 88. In the form shown, U-shaped track 84 is secured to base plate 14 spaced from and parallel to linear bearings 18 and races 20 and has a length in the linear movement direction substantially equal to the linear motion distance of linear motion device 12. In the most preferred form, track 84 and thus brake 10 are located externally of bearings 18 and races 20 and of linear motion device 12 and spaced generally perpendicular to the linear movement direction. In the most preferred form, track 84 is formed of extruded aluminum for reduced weight and is hard coated, with the extruded length of track 84 chosen to accommodate any required stroke length of sliding plate 16 or in other words the linear motion distance of linear motion device 12. In the preferred form, the outside surfaces of at least the first side wall 86 and of bottom wall 88 include a plurality of integrally formed T-shaped slots 90 for receiving T-nuts or T-bolts 92 for mounting to a variety of linear motion devices 12 and in the most preferred form to base plate 14 thereof. A trough 94 is integrally formed in bottom wall 88 intermediate side walls 86. First and second shoulders 96 extend generally perpendicularly from the edges of side walls 86 opposite to bottom wall 88, with shoulders 96 in the most preferred form including radially inwardly extending integral lips 97 for providing strength and slideable support.

Channel 82 further includes first and second end caps 98 suitably secured to the opposite ends of track 84 such as by cap screws 100 extending through end caps 98 and threadably received in track 84. Caps 98 are generally of a rectangular configuration of a size corresponding to the U-shape of track 84 and include peripheral indentations 102 corresponding to T-shaped slots 90 so that T-nuts or T-bolts 92 can be inserted into slots 90 without it being necessary to remove end caps 98. Each end cap 98 includes a clamp 104 which is slideably received in a complementary shaped socket 106 which prevents movement in a non-axial direction relative to channel 82 and allows axial slideable movement in an axial direction away from channel 82. Clamps 104 are biased away from channel 82 by compression springs 108 received in axial bores 110 and sandwiched between end cap 98 and clamp 104.

Channel 82 further includes a sheet tape seal 112 received in axial slots 114 formed in clamps 104 and being supported upon shoulders 96. Seal 112 is secured in axial slots 114 by set screws 116 threadably received in clamps 104 and abutting with seal 112 inside of slots 114. Thus, seal 112 is tensioned between end caps 98 by springs 108 which bias clamps 104 outwardly. In the most preferred form, seal 112 is also removably held to channel 82 by strips of magnetic material 118 bonded o each shoulder 96 of track 84.

Brake head assembly 80 generally includes a body 120 machined from an aluminum extrusion for reduced weight. Body 120 has an axial, through bore 122 in the most preferred form including a first, outer portion 124 of a generally circular cross section which terminates in a second, intermediate portion 126 of a generally rectangular cross section which terminates in a third, outer portion 128 of a generally circular cross section. First and second cross bores 130 of a generally circular cross-sectional shape intersect generally perpendicularly to through bore 122 with portion 126 and intermediate portions 124 and 128. End caps 134 are provided to close the outer ends of portions 124 and 128, with a gasket 136 being provided between end cap 134 and portion 128 to prevent escape of fluid between the body 120 and end cap 134. In the most preferred form, end caps 134 are removeably secured to body 120 by cap screws 101.

Brake head assembly 80 further includes an actuator element in the most preferred form of a wedge 138 having generally isosceles triangle shaped axial cross sections and generally rectangular shaped radial cross sections. Wedge 138 is of a size and shape for axial movement within portion 126 and has an axial length greater than the axial length of portion 126. Thus, wedge 138 includes first and second sides 140 of a generally rectangular configuration and having increasing spacing from a first end to a second end and includes first and second faces 141 of a generally isosceles triangular shape. Sides 140 extend in a non-axial direction within through bore 122 and generally diametrically across cross bores 130. Suitable provisions are provided for mounting wedge 138 in and for reciprocal movement inside through bore 122. In the most preferred form, first and second supports 142 and 143 are suitably secured to the first and second axial ends of wedge 138 such as by screws. First support 142 includes a periphery of a size and shape for slideable receipt in portion 128. Similarly, second support 143 includes a periphery of a size and shape for slideable receipt in portion 124. The peripheries of supports 142 and 143 each include an elastomeric seal such as an 0-ring 144 received in a peripheral groove and slideably received in through bore 122. In the most preferred form, supports 142 and 143 are of an identical construction to reduce manufacturing and inventory costs. Thus, wedge 138 is positioned in the center of through bore 122 of body 120 and is compliantly suspended therein by supports 142 and 143 on each end. Specifically, elastomeric seals such as 0-rings 144 of supports 142 and 143 allow wedge 138 to float within through bore 122 of body 120 to provide a degree of self-centering of wedge 138 in through bore 122 in non-axial directions.

Suitable provisions are provided to reciprocate wedge 138 in though bore 122. In the preferred form, wedge 138 is biased in a first axial direction which in the preferred form is to move wedge 138 in a direction with the first end preceding the second end of wedge 138. In the most preferred form, wedge 138 is biased by a compression spring 146 located in portion 124 and sandwiched between support 143 and first end cap 134 closing portion 124 of body 120. In the preferred form, wedge 138 is moved in the second axial direction which in the most preferred form is when wedge 138 is moved with the second end preceding the first end against the bias of spring 146 under fluid pressure, with the fluid being a gas and preferably air. In the most preferred form, a piston 148 is provided in sealing receipt in portion 128 and for abutment with support 142. In the most preferred form, piston 148 is sealed with portion 128 by an elastomeric seal such as an 0-ring 149 received in a peripheral groove. Thus, a fluid chamber is defined by portion 128 as defined between gasket 136 and piston 148. Suitable provisions such as a conduit 150 provides a source of fluid under pressure into the fluid chamber defined in portion 128. Thus, if the fluid pressure is insufficient to offset the bias of spring 146, spring 146 will move wedge 138 to an engaged condition. As the pressure of the fluid inside of the fluid chamber increases, wedge 138 will move and thereby compress spring 146 from its engaged condition towards a released condition, with the amount of movement depending upon the amount of fluid pressure in the fluid chamber.

Brake head assembly 80 further includes first and second calipers 152 operationally interrelated to wedge 138 and moveably mounted to body 120 between an engaged position and disengaged position by being slideably received in cross bores 130 in the most preferred form. Particularly, calipers 152 in the most preferred form each includes a carrier 154 having cross sections of a size and shape for slideable receipt in cross bores 130. The inner axial ends of carriers 154 each include a diametric groove 156 for slideably receiving wedge 138. In particular, groove 156 has parallel, first and second surfaces 156a extending axially and along a chord of the inner axial ends of carrier 154 and spaced generally equal to and for slideable abutment with the faces 141 of wedge 138. Groove 156 further includes an inner surface 156b extending diametrically in a non-axial direction and for mechanically engaging and slideable abutment with sides 140 of wedge 138. Surface 156b extends at a nonparallel angle to the axis of through bore 122 and particularly at an angle corresponding to the angle of sides 140 of wedge 138 relative to the axis of through bore 122. The outer axial ends of carrier 154 each include an interface element adapted to interface with an interface wall relative to which body 120 moves and in the most preferred form shown with one of side walls 86 of channel 82. Particularly, in the preferred form, suitable provisions are provided for removably mounting a friction facing 158 such as a recess 160 of a size corresponding to and for receipt of friction facing 158 and screws extending through friction facing 158 and threadably received in carrier 154. Friction facing 158 is of a cross sectional size smaller than the cross sectional size of carrier 154 and specifically such that the periphery of friction facing 158 is located inwardly of the periphery of carrier 154 and in the most preferred form is concentrically inwardly of the periphery of carrier 154, with the peripheries of friction facing 158 and carrier 154 both being generally cylindrical with circular cross sections. It should be appreciated that the receipt of wedge 138 in groove 156 prevents rotation of carrier 154 in cross bore 130 even when they have circular cross sections. Further, with carrier 154 received in cross bore 130 and thereby secured to sliding plate 16 by body 120, friction facings 158 are spaced from and parallel to bearings 18 and races 20.

Carriers 154 are suitably retained in body 120 and in the most preferred form biased inwardly into body 120 from their engaged position to their disengaged position. Particularly in the preferred form, a snap ring 162 is received in a groove formed in cross bore 130 axially outwardly of a portion of the carrier 154 to form a removable stop positioned in cross bore 130. For the most preferred form, a wave spring 164 is sandwiched between the outer axial end of carrier 154 outside of friction facing 158 and snap ring 162 to bias carrier 154 inwardly to its disengaged position and against wedge 138.

It should be appreciated that movement of wedge 138 in the first axial direction in bore 122 by spring 146 in the most preferred form shown moves calipers 152 toward their engaged position against the bias of springs 164 whereas movement of wedge 138 in the second axial direction in bore 122 by fluid pressure in the fluid chamber in the most preferred form shown moves calipers 152 toward their disengaged position under the bias of springs 164.

Body 120 in the preferred form is slideably supported in channel 82. Particularly, in the most preferred form, an axially extending projection is formed on the bottom surface of body 120 upon which one or more guide rails 170 are secured such as by a friction fit. The outer surface of guide rails 170 are of a size and shape for slideable receipt in trough 94 of channel 82. Guide rails 170 are formed of suitable low friction material. Additionally, body 120 includes L-shaped slots 172 for clearance of shoulders 96 and lips 97. One or more linear bearings 174 are secured such as by a friction fit within the inner legs of slots 172 and/or by set screws as shown. Bearings 174 include a slot for slideable receipt of lips 97 of channel 82, with bearings 174 being formed of suitable low friction material.

An axial slot 180 is formed in body 120 for slideably receiving tape seal 112. Inner and outer tape guides 182 and 183 are suitably secured to body 120 at each end of slot 180. Tape guides 182 and 183 are formed from material exhibiting a very low coefficient of friction to reduce potential friction between tape seal 112 and body 120. In the preferred form, inner tape guide 182 is triangular shaped in cross section and includes an inner planar surface 182a extending axially outwardly and radially inwardly from the inner surface of slot 180. Outer tape guide 183 is also triangular shaped in cross section and includes an inner planar surface 183a extending axially outwardly and radially inwardly from the outer surface of slot 180, with surfaces 183a being spaced axially outward from surface 182a.

Now that the basic construction of brake 10 according to the preferred teachings of the present invention has been explained, a method of operation and some advantages of brake 10 can be set forth. Specifically, in normal operation of linear motion device 12 and specifically in other than power outage, emergency stop, parking and similar situations, fluid is provided to the fluid chamber of brake head assembly 80 with sufficient pressure to move wedge 138 from its engaged position to its disengaged position against the bias of spring 146. As springs 164 bias carriers 154 inwardly to contact wedge 138 and due to the angle of surfaces 140, friction facings 158 are in a spaced relation from side walls 86 such that a drag force is not created. Also, it should also be appreciated that in the most preferred form, brake 10 is disengaged in normal operations of linear motion device 12 and is engaged in only limited circumstances such that wear of friction facings 158 is minimal.

With brake 10 in its disengaged position, linear motion device 12 can operate much like it would if brake 10 were not present as brake 10 does not impede movement of sliding plate 16 relative to base plate 14. Specifically, although mounted to and moveable with sliding plate 16, the presence of brake head assembly 80 has minimal effect on the dynamics of the linear motion and side loading of linear bearings 18 and races 20. Specifically, all components of assembly 80 are formed of lightweight material and preferably aluminum to minimize mass and inertia forces. Additionally, assembly 80 is slideably supported within channel 82 through the use of rails 170 and linear bearings 174 formed of low coefficient of friction material to thereby minimize any loads carried by bearings 18 and races 20 and to minimize any frictional forces which would resist movement of plate 16. In this regard, the biasing of carriers 154 is important in the elimination of friction facings 158 dragging or otherwise engaging with side walls 86.

It should be appreciated that sealing brake 10 according to the teachings of the present invention is advantageous to protect the movable components of brake 10 when used in harsh environment applications or to prevent material worn from friction facings 158 or other components from escaping from brake channel 82 when used in clean room type applications. In particular, due to the tension provided by springs 108, tape seal 112 is generally tensioned against surfaces 182a and the inner surface of slot 108 as the inner surface of slot 182 is spaced radially outwardly of shoulders 96. Seal tape 112 is held against shoulders 96 by the tension provided by spring 108 as well as the strips of magnetic material 118. Thus, as plate 16 moves relative to plate 14 and brake head assembly 80 moves relative to brake channel 82, tape seal 112 in the movement direction will move outward on surface 182a and be separated from shoulders 96 while it passes through slot 180 until it moves inward on surface 182a on the opposite end of body 120 where it again will be held on shoulders 96. Thus, tape seal 112 provides a closure between shoulders 96 to define a hollow interior within channel 82 for the components of brake 10 located therein while still allowing relative movement of brake head assembly 80 and brake channel 82.

Brake 10 according to the teachings of the present invention can be utilized to stop linearly moving loads in the event of a power outage, emergency stop, parking or similar situation. As an example, in the event of a power outage, electrical current supply would be interrupted to armature 22 and/or stator 24 which would allow relative movement of base plate 14 and sliding plate 16 (without brake 10 according to the teachings of the present invention). It can be appreciated that if linear motion device 12 (without brake 10 according to the teachings of the present invention) is vertically oriented and sliding plate 16 is vertically spaced from its lowermost position when a power failure occurs, sliding plate 16 will move downwardly under gravitational forces to its lowermost position as relative movement is not impeded by armature 22 and/or stator 24. Likewise, if sliding plate 16 is moving when a power failure occurs, sliding plate 16 will continue to move under inertia forces as relative movement is not impeded by armature 22 and/or stator 24 if brake 10 according to the teachings of the present invention is not provided. However, according to the teachings of the present invention and in the event of a power outage, power would be simultaneously interrupted to the motive force which is moving and holding wedge 138 against the bias of spring 146. In the case of the most preferred form wherein the motive force is fluid, the interruption of power could release solenoid valves which would dump fluid from the fluid chamber of brake head assembly 80. In any case, when fluid pressure decreases, spring 146 will move wedge 138 from its disengaged position to its engaged position. Due to the nonparallel angle of sides 140 to the axial direction, movement of wedge 138 causes carriers 154 to move outwardly against the bias of spring 164 to thereby engage friction facings 158 with side walls 86 of channel 82 and thereby providing a braking force to relative movement of brake head assembly 80 and channel 82 to thereby stop movement of sliding plate 16 relative to base plate 14. It should then be appreciated that the angle of surfaces 140 and 156b mechanically multiplies the force provided by spring 146 and redirects axial displacement of wedge 138 into equal and opposite transverse displacements of carriers 154, with the transverse displacements of carriers 154 relative to the axial displacement of wedge 138 being dependent upon the angle of surfaces 140 and 156b.

Brake 10 according to the preferred teachings of the present invention is formed from relatively few components which are easily manufactured and assembled. Specifically, the components of brake 10 which cannot be purchased off the shelf can be easily machined from extruded or conventional stock. Likewise, assembly can be quickly performed without requiring extraordinary skill, tools, jigs, or the like.

Brake 10 according to the teachings of the present invention does not utilize linear bearings 18 and races 20 in the braking operation. In particular, prior attempts at braking linear motion devices 12 utilized calipers which releasably gripped linear races 20 which could result in uneven wear or other detraction in the efficiency of bearings 18 and races 20. Brake 10 applies all braking force between friction facings 158 and brake channel 82 which are separate and spaced from linear bearings 18 and races 20. Additionally, as friction facings 158 are sandwiched between a pair of interface walls 86 in brake 10 in the preferred form of the present invention, side loading of linear bearings 18 and races 20 is minimized especially in comparison to if a single friction facing 158 was engaged to a single interface wall 86.

In the most preferred form of the present invention, brake 10 is positioned externally of linear motion device 12 spaced in a direction perpendicular to the linear motion direction and specifically parallel to but outside of linear bearings 18 and races 20 which in the preferred form shown is with assembly 80 and brake channel 82 located on the opposite side of the first linear bearing 18 and race 20 than the other linear bearing 18 and race 20 and than armature 22 and magnet track 24. This is advantageous for several reasons. As an example, brake 10 can be easily used as an add on module for linear motion device 12 of any design by addition of assembly 80 to sliding plate 16 and of channel 82 to base plate 14.

Now that the basic teachings of the present invention have been explained, many extensions and variations will be obvious to one having ordinary skill in the art. For example, although snap ring 162 and springs 164 of the most preferred form are believed to be advantageous in allowing assembly without other access to through bore 122, other manners for retaining and biasing carriers 154 could be utilized such as but not limited to springs extending between carriers 154 and/or body 120 generally parallel to faces 141 of wedge 138.

Similarly, although wedge 138 including two angled surfaces 140 engaging diametrically opposed carriers 154 is believed to be advantageous at least in maximizing interface area and minimizing the side loading of linear bearings 18 and races 20, brake 10 could be constructed according to the teachings of the present invention to engage a single interface wall of channel 82. Additionally, although calipers 152 are balanced to produce synergistic results when utilized with actuator element in the form of wedge 138, calipers 152 according to the teachings of the present invention would produce advantageous results in other applications or with other forms of actuation. For instance, calipers 152 could be moved to their engaged position by fluid pressure.

Likewise, although actuator element in the form of wedge 138 is axially moved by a spring 146 and a fluid chamber located on opposite axial ends thereof, actuator element 138 could be moved in other manners on the same or opposite axial ends thereof. For example, actuator element 138 could be moved in at least one direction by an electric linear actuator.

Further, although brake 10 in the most preferred form has special application for stopping linear motion of a linear motion device 12, brake 10 and/or features thereof would produce beneficial results to other applications for controlling motion according to the teachings of the present invention including but not limited to controlling rotational motion.

Additionally, although brake 10 of the most preferred form includes the combination of several, unique features believed to obtain synergistic results, brakes 10 could be constructed according to the teachings of the present invention including such features singly or in other combinations. As an example, brake 10 could be constructed without sealing provisions for protecting the movable components of brake 10 and/or for preventing the escape of worn friction facing material as in the preferred form.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, all changes which come within the meaning and range of equivalency of the claims are intended to be embraced therein.

What is claimed is:

1. Motion control apparatus comprising, in combination: a body including an axial bore; at least a first carrier movably mounted to the body between an engaged position and a disengaged position, with the carrier including an outer end including an interface element adapted to interface with an interface wall relative to which the body moves; an actuator element in the axial bore and interrelated to the carrier; and means for axially moving the actuator element in a first axial direction in the axial bore for moving the carrier towards the engaged position and in a second axial direction in the axial bore for moving the carrier towards the disengaged position, with the actuator element being mounted in the axial bore allowing movement of the actuator element in the axial bore in non-axial directions and providing self-centering of the actuator element in the axial bore in the non-axial directions.

2. The motion control apparatus of claim 1 wherein the actuator element has a first axial end and a second axial end axially spaced from the first axial end, with a first support secured to the first axial end and compliantly suspended in the axial bore, with a second support secured to the second axial end and compliantly suspended in the axial bore, with the first and second supports mounting the actuator element in the axial bore and allowing the actuator element to float within the axial bore in the non-axial directions.

3. The motion control apparatus of claim 2 wherein the first and second supports each include an elastomeric seal received in a peripheral groove and slideably received in the axial bore.

4. The motion control apparatus of claim 3 wherein the first and second supports are of identical construction.

5. The motion control apparatus of claim 2 wherein the actuator element includes at least one side extending in a non-axial direction within the axial bore, with the carrier engaging the side of the actuator element.

6. The motion control apparatus of claim 5 wherein the body includes a cross bore intersecting with the axial bore, with the carrier being slideably received in the cross bore, with the carrier being biased from the engaged position to the disengaged position.

7. The motion control apparatus of claim 6 wherein the carrier is biased by a spring sandwiched between a snap ring in the cross bore and the carrier.

8. Motion control apparatus comprising, in combination: a body including an axial bore; at least a first carrier movably mounted to the body between an engaged position and a disengaged position, with the carrier including an outer end including an interface element adapted to interface with an interface wall relative to which the body moves; an actuator element in the axial bore and interrelated to the carrier; and means for axially moving the actuator element in a first axial direction in the axial bore for moving the carrier towards the engaged position and in a second axial direction in the axial bore for moving the carrier towards the disengaged position, with the actuator element being mounted in the axial bore allowing self-centering of the actuator element in the axial bore in non-axial directions, wherein the moving means comprises a fluid chamber in operative relation with the actuator element for moving the actuator element in one of the first and second axial directions.

9. The motion control apparatus of claim 8 wherein the moving means comprises a spring located in the axial bore and sandwiched between the actuator element and the body for moving the actuator element in the other of the first and second axial directions.

10. Linear motion device comprising, in combination: a base plate; a sliding plate; first and second linear bearings mounted on one of the base plate and sliding plate and first and second linear races mounted on the other of the base plate and sliding plate for allowing linear motion of the sliding plate relative to the base plate in a linear movement direction for a distance, a stator mounted to the base plate; an armature mounted to the sliding plate and cooperating with the stator for driving the sliding plate relative to the base plate; and a linear brake including at least a first friction element secured to the sliding plate spaced from and parallel to the linear bearings and races, and a U-shaped track secured to the base plate spaced from and parallel to the linear bearings and races, with the U-shaped track having a length in the linear movement direction substantially equal to the distance, with the first friction element located within the U-shaped track and being movable between an engaged position engaging with the U-shaped track and stopping movement of the sliding plate relative to the base plate and a disengaged position which does not impede movement of the sliding plate relative to the base plate.

11. The linear motion device of claim 10 wherein the linear brake is located externally of the first and second linear bearings and races spaced generally perpendicular to the linear movement direction.

12. The linear motion device of claim 10 further comprising, in combination: first and second end caps suitably secured to opposite ends of the U-shaped track to define a channel; and a tape seal extending between the first and second end caps and removeably held to the U-shaped track to define a hollow interior within the channel, with the first friction element being movable within a body secured to the sliding plate, with the body including a slot for slideably receiving the tape seal intermediate the first and second end caps with the linear motion of the sliding plate relative to the base plate.

13. The linear motion device of claim 12 wherein the body is slideably supported within the U-shaped track to minimize force transfer by the linear brake when the first friction element is in the disengaged position.

14. The linear motion device of claim 10 wherein the first friction element is moveable within a body secured to the sliding plate; and wherein the body is slideably supported within the U-shaped track to minimize force transfer by the linear brake when the first friction element is in the disengaged position.

15. Motion control apparatus comprising, in combination: a body including a cross bore; a carrier slideably received in the cross bore, with the carrier including an inner end and an outer end, with the outer end including an interface element adapted to interface with an interface wall relative to which the body moves; a stop positioned in the cross bore; and a spring sandwiched between the stop and the carrier for biasing the carrier into the cross bore and towards a disengaged position, with the carrier being moveable towards an engaged position against the biasing of the spring, wherein the stop is removable and comprises a snap ring received in a groove formed in the cross bore.

16. Motion control apparatus comprising, in combination: a body including a cross bore having an axial extent; a carrier slideably received in the cross bore, with the carrier including an inner end and an outer end, with the outer end including an interface element adapted to interface with an interface wall relative to which the body moves; a stop positioned in the axial extent of the cross bore; and a spring positioned in the axial extent of the cross bore and sandwiched between the stop and the carrier, with the spring biasing the carrier into the cross bore and towards a disengaged position, with the carrier being moveable towards an engaged position against the biasing of the spring.

17. The motion control apparatus of claim 16 further comprising, in combination: an actuator element moveable relative to the cross bore and mechanically engaging the inner end of the carrier, with the spring located between where the actuator element mechanically engages the carrier and the interface element.

18. The motion control apparatus of claim 17 wherein the actuator element is moveable in an axial direction and includes a side extending in a non-axial direction, with the inner end of the carrier engaging the side of the actuator element.

19. The motion control apparatus of claim 18 further comprising, in combination: a diametric groove formed on the inner end of the carrier and extending in the axial direction, with the diametric groove including an inner surface extending in a non-axial direction for slideable abutment with the side of the actuator element.

20. The motion control apparatus of claim 19 wherein the body includes an axial bore which intersects with the cross bore; and wherein the motion control apparatus further comprises, in combination: means for axially moving the actuator element in the first axial direction in the axial bore for moving the carrier towards the engaged position and in a second axial direction in the axial bore for moving the carrier towards the disengaged position, with the actuator element mounted in the axial bore allowing self-centering of the actuator element in the axial bore in non-axial directions.

21. Motion control apparatus comprising, in combination: a body including a cross bore; a carrier having an outer periphery of a size and shape for slideable receipt in the cross bore with the carrier including an inner end and an outer end, with the outer end including an interface element adapted to interface with an interface wall external of the body; an actuator element moveable relative to the cross bore in an axial direction; and a diametric groove formed on the inner end of the carrier and extending in the axial direction for slideably receiving the actuator element, with the carrier being biased towards the actuator element.

22. The motion control apparatus of claim 21 further comprising, in combination: a stop positioned in the cross bore, with the cross bore having an axial extent; and a spring positioned in the axial extent of the cross bore and sandwiched between the stop and the carrier, with the spring biasing the carrier towards the actuator element.

23. The motion control apparatus of claim 21 wherein the cross bore has a generally circular cross-sectional shape, with the receipt of the actuator element in the diametric groove preventing rotation of the carrier in the cross bore.

* * * * *

UNITED STATES PATENT AND TRADEMARK OFFICE
CERTIFICATE OF CORRECTION

PATENT NO. : 6,460,678 B1  Page 1 of 1
DATED : October 8, 2002
INVENTOR(S) : Michael Henk et al.

It is certified that error appears in the above-identified patent and that said Letters Patent is hereby corrected as shown below:

Column 10,
Line 15, before "all changes" insert -- and --.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,460,678 B1 Page 1 of 1
APPLICATION NO. : 09/695507
DATED : October 8, 2002
INVENTOR(S) : Michael Henk et al.

It is certified that error appears in the above-identified patent and that said Letters Patent is hereby corrected as shown below:

Column 10, line 15, before "all changes" insert --and--.

Signed and Sealed this

Third Day of October, 2006

JON W. DUDAS
*Director of the United States Patent and Trademark Office*